US008506021B2

United States Patent
Moon

(10) Patent No.: US 8,506,021 B2
(45) Date of Patent: Aug. 13, 2013

(54) ELECTRONIC PARKING BRAKE SYSTEM AND CONTROL METHOD THEREOF

(75) Inventor: Byoung Joon Moon, Gyeonggi-do (KR)

(73) Assignee: Mando Corporation, Pyungteak-Si (KR)

( * ) Notice: Subject to any disclaimer, the term of this patent is extended or adjusted under 35 U.S.C. 154(b) by 72 days.

(21) Appl. No.: 12/890,184

(22) Filed: Sep. 24, 2010

(65) Prior Publication Data
US 2011/0073423 A1 Mar. 31, 2011

(30) Foreign Application Priority Data

Sep. 25, 2009 (KR) ........................ 10-2009-0091189

(51) Int. Cl.
*B60T 13/74* (2006.01)
*G06F 19/00* (2011.01)

(52) U.S. Cl.
USPC .............................................. 303/20; 701/70

(58) Field of Classification Search
USPC ................ 188/2 D, 156–164; 303/20, 115.2; 254/267; 701/70, 72; 74/502.4, 501.5 R
See application file for complete search history.

(56) References Cited

U.S. PATENT DOCUMENTS

| 6,012,780 | A | * | 1/2000 | Duvernay | 303/7 |
| 6,749,269 | B1 | * | 6/2004 | Niwa | 303/20 |
| 7,331,255 | B2 | * | 2/2008 | Petrak | 74/502.4 |
| 7,945,368 | B2 | * | 5/2011 | Tristano et al. | 701/78 |
| 2004/0055832 | A1 | * | 3/2004 | Mercer | 188/2 D |
| 2008/0006804 | A1 | * | 1/2008 | Pfanzer | 254/267 |
| 2008/0143179 | A1 | * | 6/2008 | Rutherford | 303/160 |
| 2009/0099748 | A1 | * | 4/2009 | Watanabe et al. | 701/70 |
| 2009/0204302 | A1 | | 8/2009 | Kondo et al. | |

FOREIGN PATENT DOCUMENTS

| KR | 10-0197212 B1 | 2/1999 |
| KR | 10-2001-0028384 A | 4/2001 |

OTHER PUBLICATIONS

Chinese Office Action, w/English translation thereof, issued in Chinese Patent Application No. CN 201010288824.5 dated Aug. 31, 2012.

* cited by examiner

*Primary Examiner* — Christopher Schwartz
(74) *Attorney, Agent, or Firm* — McDermott Will & Emery LLP

(57) ABSTRACT

Disclosed herein are an electronic parking brake system and a control method thereof. The electronic parking brake system includes a parking brake apparatus with a parking cable, a force sensing unit to sense tension of the parking cable, and an electronic control unit to measure braking force of the parking brake apparatus based on the tension, to estimate braking force of a fuzzy model, and to judge malfunction of the parking brake apparatus based on the measured braking force and the estimated braking force. Tension is estimated using the fuzzy model and is compared with the measured braking force, thereby effectively detecting malfunction of the electronic parking brake system and thus raising stability and safety of a vehicle. Further, if a residual exceeds a reference value, it is judged that the electronic parking brake apparatus malfunctions and a warning is given to a driver, thereby preventing accidents.

6 Claims, 4 Drawing Sheets

ELECTRONIC PARKING BRAKE SYSTEM AND CONTROL METHOD THEREOF

CROSS-REFERENCE TO RELATED APPLICATION

This application claims the benefit of Korean Patent Application No. 2009-0091189, filed on Sep. 25, 2009 in the Korean Intellectual Property Office, the disclosure of which is incorporated herein by reference.

BACKGROUND

1. Field

Embodiments of the present invention relate to an electronic parking brake system to detect malfunction of an electronic parking brake apparatus, and a control method thereof.

2. Description of the Related Art

In general, a brake system is a system which decelerates and stops a vehicle during driving and simultaneously maintains the stopped state of the vehicle. The brake system includes a parking brake apparatus which decelerates and stops a vehicle during driving and simultaneously maintains the stopped state of the vehicle.

The parking brake apparatus is configured such that, when a lever provided at one side of a driver's seat in a vehicle is operated, a parking cable is pulled and then provides braking force to vehicle wheels connected to the parking cable to maintain a stopped state of the vehicle wheels, and, when the lever is released, the parking cable is loosened to release the braking force from the vehicle wheels. Such an operating type of the parking brake apparatus to supply braking force to the vehicle wheels or release the braking force from the vehicle wheels using tension of the parking cable is referred to as a cable puller type.

As to such a cable puller type parking brake apparatus, a driver has to operate the lever whenever the parking brake apparatus is operated, i.e. parking or driving of the vehicle is started, only by driver's intention, and thus use of the parking brake apparatus is very cumbersome. Therefore, an electronic parking brake (EPB) system which enables a parking brake apparatus to be automatically operated by a motor according to an operating state of a vehicle has been developed.

The electronic parking brake (EPB) system operates the parking brake apparatus or stops the operation of the parking brake apparatus and ensures stability in braking in case of emergency in connection with a manual operation mode, a hydraulic electronic control unit (HECU), an engine electronic control unit (ECU), and a traction control unit (TCU) through switch operation.

The above electronic parking brake (EPB) system includes an electronic control unit (ECU), a motor, a gear, a parking cable, and a force sensor, which are integrally formed. Here, the electronic control unit (ECU) receives related data input from the hydraulic electronic control unit (HECU), the engine electronic control unit (ECU), and the traction control unit (TCU) through controller area network (CAN) communication, understands driver's intention, and then drives the motor. Then, the gear is operated by driving the motor, and the parking cable is pulled by the operation of the gear to provide braking force to vehicle wheels, thereby maintaining a stable state of the vehicle. Here, tension of the parking cable is sensed by the force sensor. Further, tension of the parking cable is automatically set based on vehicle conditions and a vehicle gradient, and the set tension of the parking cable and the sensed tension of the parking cable are compared with each other, thereby enabling proper braking force to be applied to the vehicle wheels.

If the force sensor to sense tension of the parking cable malfunctions, sufficient braking force is not supplied, thereby causing serious danger in safety of the vehicle.

SUMMARY

Therefore, it is an aspect of the present invention to provide an electronic parking brake system which effectively detects malfunction of an electronic parking brake apparatus to secure safety in operation of the electronic parking brake apparatus and driver safety, and a control method thereof.

Additional aspects of the invention will be set forth in part in the description which follows and, in part, will be obvious from the description, or may be learned by practice of the invention.

In accordance with one aspect of the present invention, an electronic parking brake system includes a parking brake apparatus with a parking cable, a force sensing unit to sense tension of the parking cable, and an electronic control unit to measure braking force of the parking brake apparatus based on the tension, to estimate braking force of a fuzzy model, and to judge malfunction of the parking brake apparatus based on the measured braking force and the estimated braking force.

The electronic parking brake system may further include a motor to apply tension to the parking cable, a current sensing unit to sense current of the motor, and a voltage sensing unit to sense voltage of a battery supplying operating power to the motor, and the electronic control unit may include a fuzzy model unit to calculate power based on the current and the voltage, to estimate temperature based on the current, to count operating time of the parking brake apparatus, and to estimate the braking force of the fuzzy model based on the power, the estimated temperature, and the operating time.

The electronic control unit may include a residual calculation unit to calculate a residual by comparing the measured braking force and the estimated braking force with each other, and a judgment unit to judge the malfunction of the parking brake apparatus by comparing the residual with a reference value.

The electronic control unit may further include an adaptability reference value storage unit to store reference values defined as adaptability reference values.

The electronic parking brake system may further include a display unit to display the malfunction of the parking brake apparatus.

In accordance with another aspect of the present invention, a control method of an electronic parking brake system includes measuring braking force of a parking brake apparatus with a motor using a force sensing unit and estimating braking force of a fuzzy model, when the parking brake apparatus is operated, and judging malfunction of the parking brake apparatus based on the measured braking force and the estimated braking force.

The judgment of the malfunction of the parking brake apparatus may include calculating a residual by comparing the measured braking force and the estimated braking force with each other, and comparing the residual with a reference value, and judging that the parking brake apparatus malfunctions and thus operating a display unit, if the residual exceeds the reference value.

The estimation of the braking force of the fuzzy model may include calculating current flowing in the motor and voltage of a battery applying operating power to the motor, counting operating time of the parking brake apparatus, estimating temperature based on the current of the motor, and estimating the braking force of the fuzzy model based on the power, the operating time, and the estimated temperature.

BRIEF DESCRIPTION OF THE DRAWINGS

These and/or other aspects of the invention will become apparent and more readily appreciated from the following description of the embodiments, taken in conjunction with the accompanying drawings of which.

DETAILED DESCRIPTION

Figure 1:
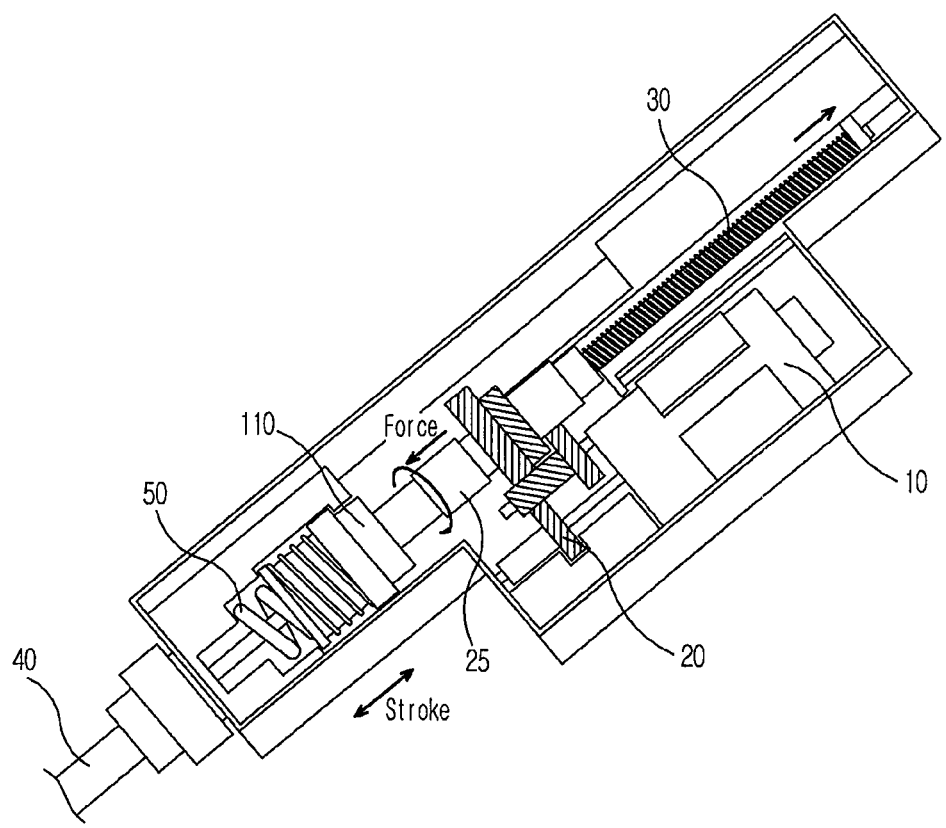
FIG. 1 is an exemplary view of an electronic parking brake apparatus in accordance with one embodiment of the present invention.

Reference will now be made in detail to the embodiments of the present invention, examples of which are illustrated in the accompanying drawings, wherein like reference numerals refer to like elements throughout.

Figure 2:
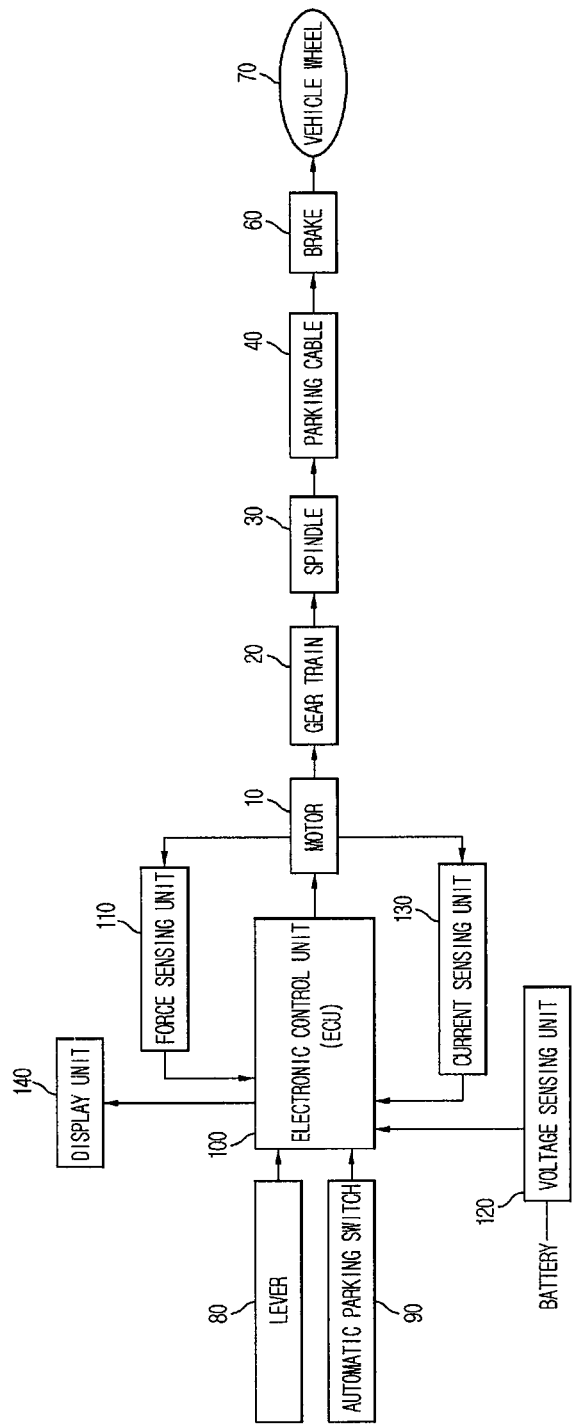
FIG. 2 is a block diagram of an electronic parking brake system in accordance with the embodiment of the present invention.
Figure 3:
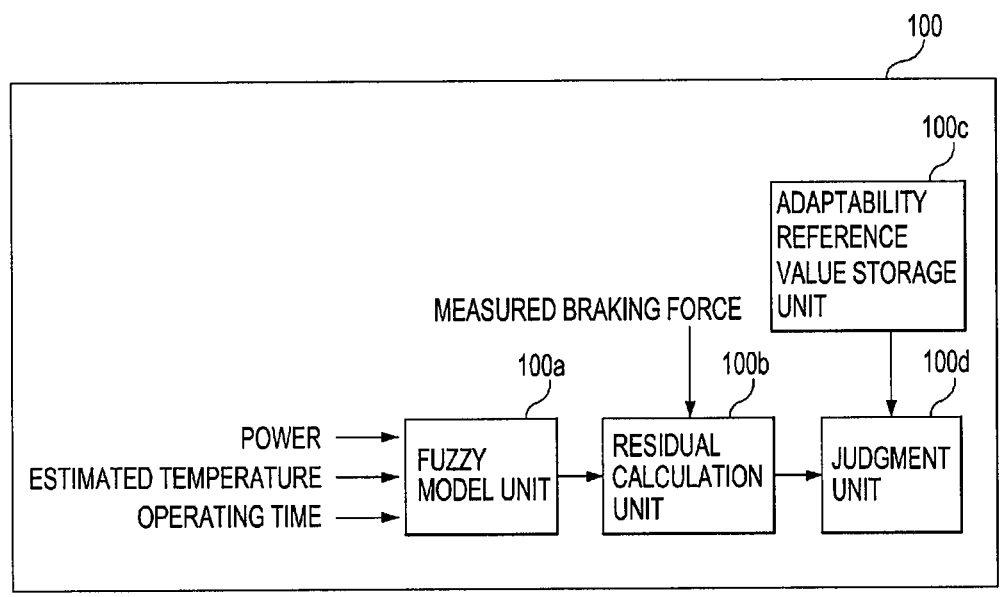
FIG. 3 is a detailed block diagram of an electronic control unit provided in the electronic parking brake system in accordance with the embodiment of the present invention.

FIG. 1 is an exemplary view of an electronic parking brake apparatus in accordance with one embodiment of the present invention, FIG. 2 is a block diagram of an electronic parking brake system to control the electronic parking brake apparatus of FIG. 1, and FIG. 3 is a detailed block diagram of an electronic control unit provided in the electronic parking brake system of FIG. 2.

The electronic parking brake apparatus, as shown in FIG. 1, is a cable puller type electronic parking brake apparatus which includes a motor 10, a gear train 20, a nut member 25, a spindle 30, a parking cable 40, and an elastic member 50. The cable puller type electronic parking brake apparatus further includes a force sensing unit 110 provided adjacent to the elastic member 50 to detect tension of the parking cable 40 during operation of the electronic parking brake apparatus.

The electronic parking brake system, as shown in FIG. 2, includes the cable puller type electronic parking brake apparatus, brakes 60, vehicle wheels 70, a lever 80, an automatic parking switch 90, an electronic control unit (ECU) 100, a voltage sensing unit 120, a current sensing unit 130, and a display unit 140. The electronic parking brake system further includes a battery to supply operating power to respective components. Hereinafter, the electronic parking brake system will be described in more detail.

The motor 10 is rotated in a regular direction or the reverse direction through power supplied from the battery during operation of the lever 80 or the automatic parking switch 90, and provides braking force to the brakes 60 or releases the braking force, thereby operating the brakes 60 or stopping the operation of the brakes 60.

The gear train 20 is driven by rotation of the motor 10 and includes a plurality of gears engaged with each other by helical gear teeth formed on the outer circumferential surfaces thereof and rotated, thereby rectilinearly reciprocating the spindle 30. The gear train 20 is provided with the nut member 25, which is screw-connected with the spindle 30 and moves in the opposite direction to the moving direction of the spindle 30.

The spindle 30 is provided with a screw formed on the outer circumferential surface thereof, and the screw is screw-connected with the nut member 25 of the gear train 20. Thereby, as the gear train 20 is driven, the spindle 30 is rotated in the nut member 25 and rectilinearly moves. The parking cable 40 is connected to the tip of the spindle 30, and thus the parking cable 40 is pulled or loosened according to the rectilinear movement of the spindle 30. When the spindle 30 moves, repulsive force corresponding to moving force of the spindle 30 is applied to the nut member 25 of the gear train 20.

The parking cable 40 is connected to the tip of the spindle 30, and is pulled or loosened according to movement of the spindle 30, thereby providing braking force to the brakes 60.

The elastic member 50 is compressed based on movement of the nut member 25 of the gear train 20. That is, the elastic member 50 is compressed based on tension applied to the parking cable 40 according to movement of the spindle 30 corresponding to movement of the nut member 25.

The brakes 60 are respectively installed at both rear vehicle wheels 70, and are connected to the spindle 30 through the parking cable 40. When tension of the parking cable 40 based on rectilinear movement of the spindle 30 is transmitted to the brakes 60, the brakes 60 supply braking force to the vehicle wheels 70 or release the braking force supplied to the vehicle wheels 70.

The lever 80 is used to allow a user to select a driving mode (D), a neutral mode (N), a reverse mode (R), a sequential mode (S), or a parking mode (P). In this embodiment, the parking mode (P) of the vehicle will be described. The lever 80 is operated by the user in order to convert the parking mode into a parking releasing mode (i.e. the driving or neutral mode) or to convert the parking releasing mode into the parking mode, and transmits an operation signal to the electronic control unit (ECU) 100.

The automatic parking switch 90 transmits an automatic parking mode set signal to the electronic control unit (ECU) 100, when the automatic parking switch 90 is turned on by the user. That is, the automatic parking switch 90 is configured such that, when the automatic parking switch 90 is turned on by the user, the parking mode or the parking releasing mode of the vehicle is automatically converted according to a change in the state of the vehicle.

The electronic control unit (ECU) 100 judges whether or not a mode change from the parking mode into the parking releasing mode or from the parking releasing mode into the parking mode is carried out by analyzing the mode signal transmitted from the lever 80, and controls operation of the brakes 60 based on a result of the judgment.

When the automatic parking mode set signal is input from the automatic parking switch 90 to the electronic control unit (ECU) 100, the electronic control unit (ECU) 100 sets an automatic parking mode, judges whether or not the mode change from the parking mode into the parking releasing mode or from the parking releasing mode into the parking mode is carried out by analyzing a state of the vehicle based on data transmitted from various sensors (not shown) or various electronic control units (not shown) of the system, and controls operation of the electronic control unit (ECU) 100 if it is judged that the mode change from the parking mode into the parking releasing mode or from the parking releasing mode into the parking mode is carried out. Further, the electronic control unit (ECU) 100 controls rotation of the motor 10 so as to operate the brakes 60 or to stop the operation of the brakes 60. Thereby, the parking mode or the parking releasing mode of the vehicle is performed.

The electronic control unit (ECU) 100 calculates tension of the parking cable 40 based on data transmitted from the force sensing unit 110, measures braking force of the brakes 60 based on the tension of the parking cable 40, and controls rotation of the motor 10 based on the measured braking force, thereby controlling the tension of the parking cable 40 and the braking force of the brakes 60.

At this time, the electronic control unit (ECU) 100 estimates braking force using a fuzzy model to detect malfunction of the force sensing unit 110 of the electronic parking brake apparatus, calculates a residual by comparing the estimated braking force with the measured braking force, compares the calculated residual with a reference value, and judges that the force sensing unit 110 provided on the electronic parking brake apparatus malfunctions and controls driving of the display unit 140, if the residual exceeds the reference value, thereby allowing a driver to recognize malfunction of the electronic parking brake apparatus.

Here, when the electronic parking brake apparatus is operated, the electronic control unit (ECU) 100 calculates power (P=VI) using voltage (V) flowing in the battery and current (I) flowing in the motor 10, counts operating time of the electronic parking brake apparatus, and estimates temperature of the electronic parking brake apparatus, thereby estimating braking force of the fuzzy model based on the power, the operating time, and the estimated temperature.

The electronic control unit (ECU) 100 estimates the temperature of the electronic parking brake apparatus using the current sensed by the current sensing unit 120 and Ohm's Law, i.e. V=IR (voltage=current*resistance). The reason why the temperature of the electronic parking brake apparatus is estimated using Ohm's Law is that resistance of the motor 10 and resistances of respective components are decreased at a low temperature and thus a large amount of current flows, and resistance of the motor 10 and resistances of respective components are increased at a high temperature and thus a small amount of current flows.

Therefore, the electronic control unit (ECU) 100 estimates the temperature of the electronic parking brake apparatus using a look up table, representing temperatures according to currents, stored in advance in a storage unit (not shown).

Hereinafter, detection of malfunction of the electronic parking brake apparatus by the electronic control unit (ECU) 100 will be described in more detail with reference to FIG. 3.

The electronic control unit (ECU) 100 includes a fuzzy model unit 100a, a residual calculation unit 100b, an adaptability reference value storage unit 100c, and a judgment unit 100d.

The fuzzy model unit 100a estimates braking force using the fuzzy model based on power, the operating time of the electronic parking brake apparatus, and the estimated temperature of the electronic parking brake apparatus, and transmits the estimated braking force to the residual calculation unit 100b.

The fuzzy model unit 100a serves to estimate the braking force based on the fuzzy theory. The fuzzy theory forms regular bases according to respective regions by dividing a fuzzy set during control of a complicated nonlinear system, thereby obtaining excellent performance compared with conventional nonlinear control.

The residual calculation unit 100b compares the estimated braking force of the fuzzy model, transmitted from the fuzzy model unit 100a, with the measured braking force, and thus calculates a residual therebetween.

The adaptability reference value storage unit 100c stores reference values adjusted according to environmental factors of the electronic parking brake apparatus. For example, the environmental factors of the electronic parking brake apparatus include temperature. In general, the standard deviation of power consumed is inversely proportional to temperature, and accuracy of the estimated braking force is increased in a high temperature area and is decreased in the low temperature area. Therefore, using the above properties, a low reference value (threshold value) is used in the temperature area having high accuracy and a high reference value is used in the temperature area having low accuracy, thereby minimizing the influence of temperature variation while detecting malfunction of the electronic parking brake apparatus.

The judgment unit 100d compares the residual transmitted from the residual calculation unit 100c with the adaptability reference value transmitted from the adaptability reference value storage unit 100b, and judges that the electronic parking brake apparatus malfunctions if the residual exceeds the adaptability reference value, and judges that the electronic parking brake apparatus is normal if the residual does not exceed the adaptability reference value.

The force sensing unit 110 measures tension applied to the parking cable 40. In more detail, force repulsive to moving force of the spindle 30 pulling the parking cable 40 when the motor 10 is rotated is applied to the nut member 25 and thus the nut member 25 moves, and the elastic member 50 is compressed by moving force of the nut member 25. Then, the force sensing unit 110 senses tension applied to the parking cable 40, and transmits the tension to the electronic control unit (ECU) 100.

Here, tension refers to force to pull or loosen the parking cable 40 by means of rotation of the nut member 25, and when tension increases, braking force increases. The force sensing unit 110 include a hall sensor (not shown), the position of which is fixed, and a magnet (not shown), the position of which is varied according to compression of the elastic member 50.

That is, when the elastic member 50 is compressed by movement of the nut member 25, the position of the magnet of the force sensing unit 110 is varied, and a distance between the hall sensor and the magnet is varied and a strength of magnetic force sensed by the hall sensor is changed. Then, the hall sensor transmits the sensed strength of magnetic force to the electronic control unit (ECU) 100.

Thereby, the electronic control unit (ECU) 100 calculates tension corresponding to the changed strength of magnetic force of the hall sensor (hall IC), and measures braking force corresponding to the tension. Here, tension of the parking cable 40 based on mutual relations between the magnitude of a signal of the hall sensor and an amount of movement of the magnet is predetermined.

The hall sensor may count the number of rotations of the motor 10 during rotation of the motor 10 in the regular direction or the reverse direction, and transmit the counted number of rotations of the motor 10 to the electronic control unit (ECU) 100.

The voltage sensing unit 120 senses voltage applied to both ends of the battery driving the electronic parking brake apparatus, and transmits the sensed voltage to the electronic control unit (ECU) 100. The current sensing unit 130 senses current flowing in the motor 10 driven to operate the brakes 60 or stop the operation of the brakes 60 during rotation of the motor 10 in the regular direction or the reverse direction, and transmits the sensed current to the electronic control unit (ECU) 100.

The display unit 140 displays whether or not the electronic parking brake apparatus malfunctions to a driver. The display unit 140 audibly indicates malfunction of the electronic parking brake apparatus using a buzzer, or visually indicates malfunction of the electronic parking brake apparatus using a display light, such as an LED.

Figure 4:
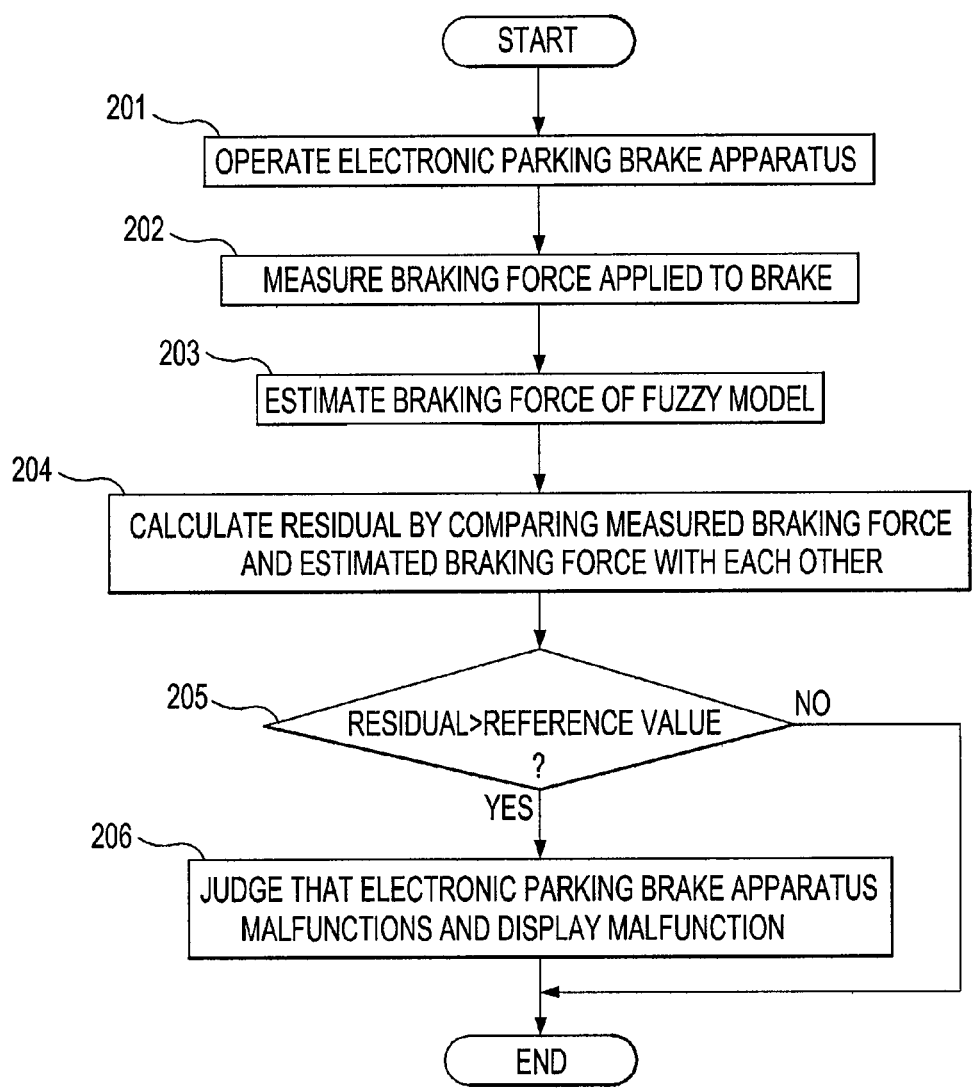
FIG. 4 is a flow chart illustrating a control method of the electronic parking brake system in accordance with the embodiment of the present invention.

FIG. 4 is a flow chart illustrating a control method of the electronic parking brake system in accordance with the embodiment of the present invention. Hereinafter, the control method of the electronic parking brake system will be described with reference to FIGS. 1 to 4.

In this embodiment, the cable puller type electronic parking brake apparatus is described. When the automatic parking mode is performed by operating the lever 80 or turning on the automatic parking switch 90, the motor 10 is rotated if automatic parking needs to be performed.

Thereafter, rotating force of the motor 10 is converted into rectilinear movement of the spindle 30 by the gear train 20, and the parking cable 40 fixed to the tip of the spindle 30 is pulled by the movement of the spindle 30. When tension higher than target tension is applied to the parking cable 40, the brakes 60 provided on the vehicle wheels 70 are operated, thereby maintaining a stable posture of the vehicle.

When the electronic parking brake apparatus is operated (operation 201), as described above, in order to provide proper braking force to the brakes 60, tension applied to the parking cable 40 is sensed, braking force applied to the brakes 60 is measured based on the tension, and then the tension of the parking cable 40 is adjusted based on the measured braking force, thereby allowing proper braking force to be applied to the brakes 60. Here, whether or not the electronic parking brake apparatus malfunctions is detected. This will be described below in more detail.

If it is judged that the parking mode is performed after the turning-on of the automatic parking switch 90, the motor 10 is rotated. At this time, the spindle 30 is moved by the rotation of the motor 10 via the gear train 20, the parking cable 40 connected to the tip of the spindle 30 is pulled according to the movement of the spindle 30, and tension is applied to the parking cable 40.

Moving force in a direction opposite to the moving direction of the spindle 30 is applied to the nut member 25 of the gear train 20 screw-connected to the spindle 30, and the elastic member 50 is compressed by the moving force of the nut member of the gear train 20. As the nut member 25 moves and the elastic member 50 is compressed, the magnet of the force sensing unit 110 moves and the strength of magnetic force sensed by the hall sensor of the force sensing unit 110 is varied. Tension of the parking cable 40 is calculated based on the magnetic force sensed by the hall sensor of the force sensing unit 110, and braking force applied to the brakes 60 is measured based on the calculated tension of the parking cable 40 (operation 202).

Thereafter, power (P=VI) is calculated using voltage (V) flowing in the battery and current (I) flowing in the motor 10, operating time of the electronic parking brake apparatus is counted, and temperature of the electronic parking brake apparatus is estimated, thereby estimating braking force of the fuzzy model based on the power, the operating time, and the estimated temperature (operation 203).

Here, the temperature of the electronic parking brake apparatus is estimated using the current sensed by the current sensing unit 120 and Ohm's Law, i.e. V=IR (voltage=current*resistance). The look up table, representing temperatures according to currents, is stored in advance in the storage unit (not shown).

The reason why the temperature of the electronic parking brake apparatus is estimated using Ohm's Law is that resistance of the motor 10 and resistances of respective components are decreased at a low temperature and thus a large amount of current flows, and resistance of the motor 10 and resistances of respective components are increased at a high temperature and thus a small amount of current flows.

Thereafter, a residual is calculated by comparing the estimated braking force of the fuzzy model and the measured braking force with each other (operation 204). Then, the calculated residual is compared with a reference value (operation 205), and it is judged that the electronic parking brake apparatus is in a normal state, if the residual does not exceed the reference value, and it is judged that the electronic parking brake apparatus malfunctions and the display unit 140 displays the malfunction of the electronic parking brake apparatus so as to allow a driver to recognize the malfunction of the electronic parking brake apparatus, if the residual exceeds the reference value (operation 206).

Here, the reference value is an adaptability reference value corresponding to environmental factors of the electronic parking brake apparatus.

For example, the environmental factors of the electronic parking brake apparatus include temperature. In general, the standard deviation of power consumed is inversely proportional to temperature, and accuracy of the estimated braking force is increased in a high temperature area and is decreased in the low temperature area. Therefore, using the above properties, a low reference value (threshold value) is used in the temperature area having high accuracy and a high reference value is used in the temperature area having low accuracy, thereby minimizing the influence of a temperature variation while detecting malfunction of the electronic parking brake apparatus.

Malfunction of the electronic parking brake apparatus is detected by estimating braking force using the fuzzy model effectively representing the nonlinear system and comparing the estimated braking force with the measured braking force applied to the parking cable. Thereby, malfunction of the electronic parking brake apparatus is effectively detected, thus raising stability and safety of a vehicle.

Further, if the residual between the measured braking force applied to the parking cable and the estimated braking force of the fuzzy model exceeds the reference value, it is judged that the electronic parking brake apparatus malfunctions and a warning is given to a driver, thereby preventing accidents.

Thereafter, if it is judged that the electronic parking brake apparatus is in the normal state, the measured braking force of the brakes 60 is compared with a target braking force. If the measured braking force of the brakes 60 is greater than the target braking force, the rotation of the motor 10 is stopped, and if the measured braking force of the brakes 60 is not greater than the target braking force, driving of the motor 10 is re-controlled so that the measured braking force of the brakes reaches the target braking force.

As described above, tension of the parking cable 40 is calculated according to current of the motor 10, and a control signal to control the rotation of the motor 10 is generated according to the calculated tension of the parking cable 40, thereby accurately controlling braking force of the brakes 60.

As is apparent from the above description, in an electronic parking brake system and a control method thereof in accordance with one embodiment of the present invention, tension is estimated using a fuzzy model effectively representing a nonlinear system and is compared with measured braking force applied to a parking cable, thereby effectively detecting malfunction of the electronic parking brake system and thus raising stability and safety of a vehicle.

Further, if a residual between the measured braking force applied to the parking cable and the estimated braking force of the fuzzy model exceeds a reference value, it is judged that the electronic parking brake apparatus malfunctions and a warning is given to a driver, thereby preventing accidents.

Moreover, braking force applied to the parking cable is estimated in consideration of a variation in output of a force sensing unit according to a temperature variation, and malfunction of the electronic parking brake system is detected based on the estimated braking force, thus accurately detecting the malfunction of the electronic parking brake apparatus even in a low temperature or high temperature condition. Thereby, reliability in a method of detecting malfunction of the electronic parking brake apparatus is improved.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. An electronic parking brake system, comprising:
   a parking brake apparatus with a parking cable;
   a force sensing unit configured to sense a tension of the parking cable; and
   an electronic control unit configured to measure a first braking force of the parking brake apparatus based on the sensed tension, estimate a second braking force of the parking brake apparatus with a fuzzy model, and judge malfunction of the parking brake apparatus based on the measured first braking force and the estimated second braking force,
   wherein the electronic control unit includes:
      a residual calculation unit configured to calculate a residual by comparing the measured first braking force and the estimated second braking force with each other, the residual representing a difference between the measured first braking force and the estimated second braking force; and
      a judgement unit configured to judge the malfunction of the parking brake apparatus by comparing the residual with a reference value.

2. The electronic parking brake system according to claim 1, further comprising:
   a motor to apply a tension to the parking cable;
   a current sensing unit to sense a current of the motor; and
   a voltage sensing unit to sense a voltage of a battery supplying operating power to the motor,
   wherein the electronic control unit includes a fuzzy model unit:
   to calculate a power based on the sensed current and the sensed voltage,
   to estimate a temperature based on the sensed current,
   to count operating time of the parking brake apparatus, and
   to estimate the second braking force of the parking brake apparatus with the fuzzy model based on the calculated power, the estimated temperature, and the counted operating time.

3. The electronic parking brake system according to claim 1, wherein the electronic control unit further includes an adaptability reference value storage unit to store reference values defined as adaptability reference values.

4. The electronic parking brake system according to claim 1, further comprising a display unit to display the malfunction of the parking brake apparatus.

5. A control method of an electronic parking brake system, comprising:
   measuring, with a force sensing unit, a first braking force of a parking brake apparatus with a motor and estimating a second braking force of the parking brake apparatus with a fuzzy model, when the parking brake apparatus is operated; and
   judging malfunction of the parking brake apparatus based on the measured first braking force and the estimated second braking force,
   wherein the judgment of the malfunction of the parking brake apparatus includes:
      calculating a residual by comparing the measured first braking force with the estimated second braking force, the residual representing a difference between the measured first braking force and the estimated second braking force; and
      comparing the residual with a reference value, and
      judging, when the residual exceeds the reference value, that the parking brake apparatus malfunctions and operating a display unit to display the malfunction of the parking brake apparatus.

6. A control method of an electronic parking brake system, comprising:
   measuring, with a force sensing unit, a first braking force of a parking brake apparatus with a motor and estimating a second braking force of the parking brake apparatus with a fuzzy model, when the parking brake apparatus is operated; and
   judging malfunction of the parking brake apparatus based on the measured first braking force and the estimated second braking force,
   wherein the estimation of the second braking force of the parking brake apparatus includes:
   calculating a current flowing in the motor and a voltage of a battery applying operating power to the motor;
   counting operating time of the parking brake apparatus;
   estimating a temperature based on the calculated current of the motor; and
   estimating the second braking force of the parking brake apparatus based on a calculated power, the counted operating time, and the estimated temperature.

* * * * *